Patented Apr. 8, 1941

2,238,021

UNITED STATES PATENT OFFICE 2,238,021

AMMONIATED TALL OIL PRODUCT AND METHOD OF PRODUCING THE SAME

David W. Jayne, Jr., Port Chester, N. Y., assignor to American Cyanamid Company, New York, N. Y., a corporation of Maine No Drawing. Application August 23, 1938, Serial No. 226,262

11 Claims. (Cl. 260—97.5)

This invention relates to a new ammoniated tall oil product and to a method of producing the same.

Tall oil which is a mixture of fatty acids and rosin acids has been used extensively as a flotation agent and various soaps have been produced in aqueous solution by treating the acid mixture with alkalies. An ammonium soap solution can be obtained if the solution is kept sufficiently dilute. The ammonium soap of tall oil has many desirable properties as a flotation agent but when obtained in the form of a dilute solution in water is not commercially useful because of the excessive cost of shipping the large amount of water which is necessary to maintain the product in a form in which it can be introduced into flotation operations. Attempts have been made to obtain an anhydrous ammonium salt but up to the present invention, have proven failures because the ammonium salt is not stable against the heat necessary for evaporating aqueous solutions and products are obtained which are not pure ammonium salts and which are greasy, gelatinous materials which do not readily disperse in water.

According to the present invention, alcoholic solutions of substantially anhydrous, substantially completely saponified ammonium tall oil soap are prepared by dissolving the tall oil in a small amount of alcohol and introducing ammonia in an anhydrous form until the saponification is substantially complete. If the mixture is maintained substantially anhydrous, a relatively clear solution is obtained which contains a little excess ammonia dissolved in the alcohol. The solution is a homogeneous, dark amber fluid which readily dissolves in water to give a nearly clear solution. The solution is so concentrated that it can be readily shipped and does not present any of the difficulties involved in partially saponified ammonium tall oil soaps which have been obtained in a dry condition or containing relatively small amounts of water.

The alcohol which is used in the process of the present invention and to produce the new product is not particularly critical so long as anhydrous solutions are readily obtainable. Thus, for example, anhydrous methanol, isopropanol, butanols, both secondary and tertiary, tertiary amyl alcohol and the like may be used. Absolute ethyl alcohol can also be used but because of the tendency for absolute ethyl alcohol to absorb water it is difficult to maintain anhydrous or substantially anhydrous conditions and while, therefore, anhydrous ethyl alcohol solutions are included in the present invention, the difficulties of preparing them render the use of ethyl alcohol practically less desirable than the other alcohols which are less hygroscopic.

The invention is not limited to any particular concentration but preferably solutions of high concentration are prepared containing more than 50% of the ammonium salt of tall oil. Solutions containing 80% of the ammonium salt are obtainable in anhydrous methanol and 70% solutions are readily obtained in isopropanol, secondary and tertiary butanols and tertiary amyl alcohol.

The invention will be described in greater detail in connection with the following specific examples which illustrate typical embodiments of the invention. The parts are by weight.

Example 1

2 parts of refined tall oil are introduced into 1 part of isopropyl alcohol and anhydrous ammonia is bubbled through the mixture with cooling until a slight excess of ammonia is present. The product is a clear, homogeneous, dark amber fluid, readily soluble in water to give a nearly clear solution. The solution contains approximately 70% of the ammonium salt of tall oil and 30% of alcohol.

Example 2

2 parts of tall oil are dispersed in 1 part of secondary butyl alcohol, the mixture is cooled, and anhydrous ammonia bubbled in until a slight excess is present. A homogeneous, dark amber fluid is obtained which frequently sets to a stiff gel but which is readily dispersible in water. This product contains 70% of the ammonium salt of tall oil.

By the same procedure, corresponding solutions of the ammonium salt of tall oil in tertiary butyl or tertiary amyl alcohols can be obtained by substituting the corresponding amounts of the tertiary alcohols for the secondary alcohol. These solutions do not tend to form gels.

In the examples the anhydrous ammonia is described as being introduced in the gaseous form. For commercial production, this is usually the cheapest method, but the results are equally good for anhydrous liquid ammonia.

What I claim is:

1. A substantially anhydrous solution of the ammonium salts of tall oil acids in a paraffin alcohol of one to five carbon atoms.

2. A substantially anhydrous solution of the ammonium salts of tall oil acids in a paraffin alcohol of one to five carbon atoms containing at least 50% of the ammonium salts by weight.

3. A substantially anhydrous solution of the ammonium salts of tall oil acids in a paraffin alcohol of one to five carbon atoms containing at least 70% of the ammonium salts by weight.

4. A substantially anhydrous solution in isopropyl alcohol of the ammonium salts of tall oil acids containing at least 50% of the ammonium salts by weight.

5. A substantially anhydrous solution in tertiary butyl alcohol of the ammonium salts of tall oil acids containing at least 50% of the ammonium salts by weight.

6. A substantially anhydrous solution in tertiary amyl alcohol of the ammonium salts of tall oil acids containing at least 50% of the ammonium salts by weight.

7. A method of preparing a substantially anhydrous alcoholic solution of the ammonium salts of tall oil acids which comprises dispersing tall oil in a paraffin alcohol of from one to five carbon atoms, cooling the mixture and introducing anhydrous ammonia until the salt formation is substantially complete.

8. A method of preparing a substantially anhydrous solution in isopropyl alcohol of the ammonium salts of tall oil acids which comprises dispersing tall oil in isopropyl alcohol, cooling the mixture and introducing anhydrous ammonia until the salt formation is substantially complete.

9. A method of preparing a substantially anhydrous solution in tertiary butyl alcohol of the ammonium salts of tall oil acids which comprises dispersing tall oil in tertiary butyl alcohol, cooling the mixture and introducing anhydrous ammonia until the salt formation is substantially complete.

10. A method of preparing a substantially anhydrous solution in tertiary amyl alcohol of the ammonium salts of tall oil acids which comprises dispersing tall oil in tertiary amyl alcohol, cooling the mixture and introducing anhydrous ammonia until the salt formation is substantially complete.

11. A method according to claim 7 in which the proportion of tall oil to alcohol is substantially two to one.

DAVID W. JAYNE, Jr.